(12) United States Patent
Arvanitis et al.

(10) Patent No.: US 12,502,558 B2
(45) Date of Patent: Dec. 23, 2025

(54) TRANS-SKULL FOCUSED ULTRASOUND USING ACOUSTIC HOLOGRAM AND HETEROGENOUS ANGULAR SPECTRUM APPROACH, AND HOLOGRAM REGISTRATION

(71) Applicant: Georgia Tech Research Corporation, Atlanta, GA (US)

(72) Inventors: Costas Arvanitis, Atlanta, GA (US); Pradosh Pritam Dash, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/638,465

(22) Filed: Apr. 17, 2024

(65) Prior Publication Data

US 2024/0342511 A1    Oct. 17, 2024

Related U.S. Application Data

(60) Provisional application No. 63/496,641, filed on Apr. 17, 2023.

(51) Int. Cl.
| | |
|---|---|
| *A61N 7/00* | (2006.01) |
| *B29C 64/386* | (2017.01) |
| *B33Y 50/00* | (2015.01) |
| *B33Y 80/00* | (2015.01) |
| B29L 31/00 | (2006.01) |

(52) U.S. Cl.
CPC ............. *A61N 7/00* (2013.01); *B29C 64/386* (2017.08); *B33Y 50/00* (2014.12); *B33Y 80/00* (2014.12); *A61N 2007/0026* (2013.01); *A61N 2007/0039* (2013.01); *A61N 2007/006* (2013.01); *A61N 2007/0073* (2013.01); *B29L 2031/753* (2013.01)

(58) Field of Classification Search
CPC .............. A61N 7/00; A61N 2007/0026; A61N 2007/0039; A61N 2007/006; A61N 2007/0073; A61N 2007/0095; A61N 7/02; B29C 64/386; B33Y 50/00; B33Y 80/00; B29L 2031/753
See application file for complete search history.

(56) References Cited

U.S. PATENT DOCUMENTS

| | | | |
|---|---|---|---|
| 2012/0083718 A1* | 4/2012 | Alleman | A61B 8/4427 601/2 |
| 2021/0283428 A1* | 9/2021 | Konofagou | A61N 7/02 |
| 2022/0011270 A1* | 1/2022 | Arvanitis | G01N 29/348 |

FOREIGN PATENT DOCUMENTS

| | | | | |
|---|---|---|---|---|
| WO | WO-2013102180 A1 * | 7/2013 | | A61N 7/00 |
| WO | WO-2014176483 A1 * | 10/2014 | | A61N 7/00 |

* cited by examiner

*Primary Examiner* — Joel Lamprecht
(74) *Attorney, Agent, or Firm* — TROUTMAN PEPPER LOCKE LLP; Ryan A. Schneider; Korbin M. Blunck

(57) ABSTRACT

This disclosure describes systems and methods for producing and registration of an acoustic holographic lens for trans-skull focused ultrasound (FUS). In one example embodiment, the lens is produced using a heterogenous angular spectrum approach that performs computations in the frequency domain, enabling pressure fields created with selected frequencies. In another example embodiment, precise registration of the lens with skull geometry is achieved via use of a nonlinear parametric array effect.

29 Claims, 8 Drawing Sheets

TRANS-SKULL FOCUSED ULTRASOUND USING ACOUSTIC HOLOGRAM AND HETEROGENOUS ANGULAR SPECTRUM APPROACH, AND HOLOGRAM REGISTRATION

CROSS-REFERENCE TO RELATED APPLICATION(S)

This application claims the benefit of U.S. Provisional Application No. 63/496,641, filed on 17 Apr. 2023, which is hereby incorporated herein by reference in its entirety as if fully set forth below.

GOVERNMENT SPONSORSHIP

This invention was made with government support under Grant No. 1933158 awarded by the National Science Foundation. The government has certain rights in the invention.

FIELD OF THE DISCLOSURE

Embodiments of the present disclosure relate generally to systems and methods for focused ultrasound (FUS) and, more particularly, to trans-skull FUS using an acoustic hologram and a heterogenous angular spectrum approach.

BACKGROUND

FUS is a widely adopted therapeutic tool that uses non-ionizing radiation to non-invasively target and manipulate or destroy tissue. However, using FUS therapy in the brain is challenging due to the strong distortions caused by the skull in the transmitted wavefields. Aberration correction of the skull is crucial for successful FUS therapy in the brain. While these aberrations can be compensated for using expensive and MRI-dependent phased array-based systems, such as MR-guided FUS (MRgFUS), these MRI-reliant systems are costly and not suitable for global upscaling, particularly in rural areas and developing countries, which limits their widespread clinical adoption.

To overcome this challenge, 3D printed phase plates or acoustic lenses/holograms have been proposed as a more affordable alternative. Nonetheless, two significant obstacles remain: Firstly, designing such holograms using time-domain-based approaches is computationally intensive. Secondly, there is a need to register these lenses accurately to the skull geometry.

Thus, it is desirable to provide an alternative system and method for FUS that is able to overcome the above disadvantages.

Advantages of the present invention will become more fully apparent from the detailed description of the invention hereinbelow.

SUMMARY

An exemplary embodiment of the present invention provides a method for producing a lens for an ultrasound device. The method can comprise: providing a barrier tissue model, a soft tissue model surrounded by the barrier tissue model, and a coupling medium model, wherein the barrier tissue model presents an acoustic impedance different from that of the soft tissue model; choosing a source plane situated in the coupling medium model; choosing a predetermined wave frequency and wavelength of an ultrasound wave, the predetermined wavelength being determined by the predetermined frequency and a velocity of propagation of the ultrasound wave in the coupling medium model; providing a target plane situated inside the soft tissue model; providing a plurality of nodes distributed on the target plane, thereby creating a reference image; projecting planar ultrasound waves, in the frequency domain, from the source plane, through both the barrier tissue model and soft tissue model, and to the target plane, wherein the projected planar ultrasound waves have an input phase and a uniform amplitude; normalizing an intensity of the planar ultrasound waves on the target plane; normalizing pixel values associated with the reference image; comparing the normalized intensity of the planar ultrasound waves on the target plane with the normalized pixel values associated with the reference image; determining a gradient of a difference in the comparing step between the normalized intensity of the planar ultrasound waves on the target plane and the normalized pixel values associated with the reference image; applying a gradient descent approach to minimize the difference in the comparing step, to thereby update a phase of the planar ultrasound waves; applying a plurality of iterations by repeating the projecting and subsequent steps above, whereby the normalized intensity of the planar ultrasound waves on the target plane resembles the normalized pixel values associated with the reference image, resulting in a distribution of phases on the source plane, thereby creating a phase profile map at the source plane; converting the phase profile map to a thickness profile map; and producing the lens using the thickness profile map.

In any of the embodiments described herein, the method can further include applying amplitude compensation considering transmission due to a finite thickness obtained from the phase profile map, whereby the uniform amplitude in the projecting step may be adjusted based on the compensated amplitude.

In any of the embodiments described herein, the comparing step can be performed using a mean absolute loss function.

In any of the embodiments described herein, the intensity of the planar ultrasound waves on the target plane can be the square of the amplitude of the planar ultrasound waves on the target plane.

In any of the embodiments described herein, the producing step is performed using a 3D printer.

In any of the embodiments described herein, the predetermined frequency is in the range of 100 kHz and 20 MHz, although the predetermined frequency can be beyond this range.

In any of the embodiments described herein, the gradient descent approach comprises a stochastic descent approach.

In any of the embodiments described herein, the gradient descent approach uses an adaptive moment estimation (ADAM) optimizer.

In any of the embodiments described herein, the source plane is at or within an ultrasound transducer.

In any of the embodiments described herein, an apparatus may comprise a lens produced by the method of claim 1.

In any of the embodiments described herein the same method can be used to design and build impedance matching layers between the transducer and the lens and the lens and the coupling medium or the skull.

Another exemplary embodiment of the present invention provides a method for positioning a lens for an ultrasound device. The method can comprise: placing a lens in a first position between an ultrasound transducer and a skull of a patient; applying ultrasound to a target area of the brain of the patient through a first region of the skull while the lens is in the first position; moving the lens relative to the skull to additional positions between the ultrasound transducer and the skull; applying ultrasound to the target area of the brain through additional regions of the skull while the lens is in each of the additional positions; measuring, using an acoustic sensor, the generation of nonlinear acoustic effects resulting from the applying steps; identifying the minimal generation of nonlinear acoustic effects based on the measuring step; determining an optimum position of the lens based on the identified minimal generation of nonlinear acoustic effects; and placing the lens in the optimum position.

In any of the embodiments described herein, the measuring step comprises measuring parametric pressures (i.e., pressures due to a nonlinear parametric array effect) within the skull resulting from the applying steps, and the identifying step comprises identifying a lowest parametric pressure within the skull from amongst the measured parametric pressures based on the measuring step.

In any of the embodiments described herein, each of the applying steps utilize two primary ultrasound waves centered around a fundamental frequency and differing by a difference frequency.

In any of the embodiments described herein, the fundamental frequency can be in the range of 100 kHz-20 MHz, and the difference frequency is in the range of 1 kHz-500 kHz, although both frequencies can be beyond these ranges.

In any of the embodiments described herein, the acoustic sensor can be placed exteriorly to the skull on a side of the skull opposite the ultrasound transducer, or even placed at any location outside the skull.

In any of the embodiments described herein, the ultrasound transducer comprises a single ultrasound transducer.

In any of the embodiments described herein, the ultrasound transducer comprises a phased array ultrasound transducer.

Another exemplary embodiment of the present invention provides a system for producing a lens for an ultrasound device. The system can comprise: an ultrasound transducer; a 3D printer; a barrier tissue model; a soft tissue model surrounded by the barrier tissue model, wherein the barrier tissue model presents an acoustic impedance different from that of soft tissue model; a coupling medium model; a processor in communication with the ultrasound transducer and the 3D printer; and a memory. The memory can be in communication with the processor and can store instructions that, when executed, cause the system to: choose a source plane, of the ultrasound transducer, situated in the coupling medium model; choose a predetermined wave frequency and wavelength of an ultrasound wave, of the ultrasound transducer, the predetermined wavelength being determined by the predetermined frequency and a velocity of propagation of the ultrasound wave in the coupling medium model; provide a target plane situated inside the soft tissue model; provide a plurality of nodes distributed on the target plane, thereby creating a reference image; project, via the ultrasound transducer, planar ultrasound waves, in the frequency domain, from the source plane, through both the barrier tissue model and soft tissue model, and to the target plane, wherein the projected planar ultrasound waves have an input phase and a uniform amplitude; normalize an intensity of the planar ultrasound waves on the target plane; normalize pixel values associated with the reference image; compare the normalized intensity of the planar ultrasound waves on the target plane with the normalized pixel values associated with the reference image; determine a gradient of a difference in the comparing step between the normalized intensity of the planar ultrasound waves on the target plane and the normalized pixel values associated with the reference image; apply a gradient descent approach to minimize the difference in the comparing step, to thereby update a phase of the planar ultrasound waves; apply a plurality of iterations by repeating the projecting and subsequent steps above, whereby the normalized intensity of the planar ultrasound waves on the target plane resembles the normalized pixel values associated with the reference image, resulting in a distribution of phases on the source plane, thereby creating a phase profile map at the source plane; convert the phase profile map to a thickness profile map; and produce (e.g., via the 3D printer) the lens using the thickness profile map.

In any of the embodiments described herein, the instructions can further cause the system to apply amplitude compensation considering transmission due to a finite thickness obtained from the phase profile map, whereby the uniform amplitude in the project step is adjusted based on the compensated amplitude.

In any of the embodiments described herein, the compare step is performed using a mean absolute loss function.

In any of the embodiments described herein, the intensity of the planar ultrasound waves on the target plane is the square of the amplitude of the planar ultrasound waves on the target plane.

In any of the embodiments described herein, the predetermined frequency is in the range of 100 kHz and 20 MHz, although the predetermined frequency can be beyond this range.

In any of the embodiments described herein, the gradient descent approach comprises a stochastic descent approach.

In any of the embodiments described herein, the gradient descent approach uses an ADAM optimizer.

Another exemplary embodiment of the present invention provides a system for positioning a lens for an ultrasound device. The system can comprise: an ultrasound transducer; a lens; an acoustic sensor; a processor in communication with the ultrasound transducer and the lens; and a memory. The memory can be in communication with the processor and can store instructions that, when executed, cause the system to: place the lens in a first position between the ultrasound transducer and a skull of a patient; apply, via the ultrasound transducer, ultrasound to a target area of the brain of the patient through a first region of the skull while the lens is in the first position; move the lens relative to the skull to additional positions between the ultrasound transducer and the skull; apply, via the ultrasound transducer, ultrasound to the target area of the brain through additional regions of the skull while the lens is in each of the additional positions; measure, using the acoustic sensor, the generation of nonlinear acoustic effects resulting from the apply steps; identify the minimal generation of nonlinear acoustic effects based on the measure step; determine an optimum position of the lens based on the identified minimal generation of nonlinear acoustic effects; and place the lens in the optimum position.

In any of the embodiments described herein, the measure step comprises measuring parametric pressures within the skull resulting from the applying steps, and the identify step comprises identifying a lowest parametric pressure within the skull from amongst the measured parametric pressures based on the measure step.

In any of the embodiments described herein, each of the apply steps utilize two primary ultrasound waves centered around a fundamental frequency and differing by a difference frequency.

In any of the embodiments described herein, the fundamental frequency can be in the range of 100 kHz-20 MHz, and the difference frequency is in the range of 1 kHz-500 kHz, although both frequencies can be beyond these ranges.

In any of the embodiments described herein, the acoustic sensor is placed exteriorly to the skull on a side of the skull opposite the ultrasound transducer, or even placed at any location outside the skull.

In any of the embodiments described herein, the ultrasound transducer comprises a single ultrasound transducer.

In any of the embodiments described herein, the ultrasound transducer comprises a phased array ultrasound transducer.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
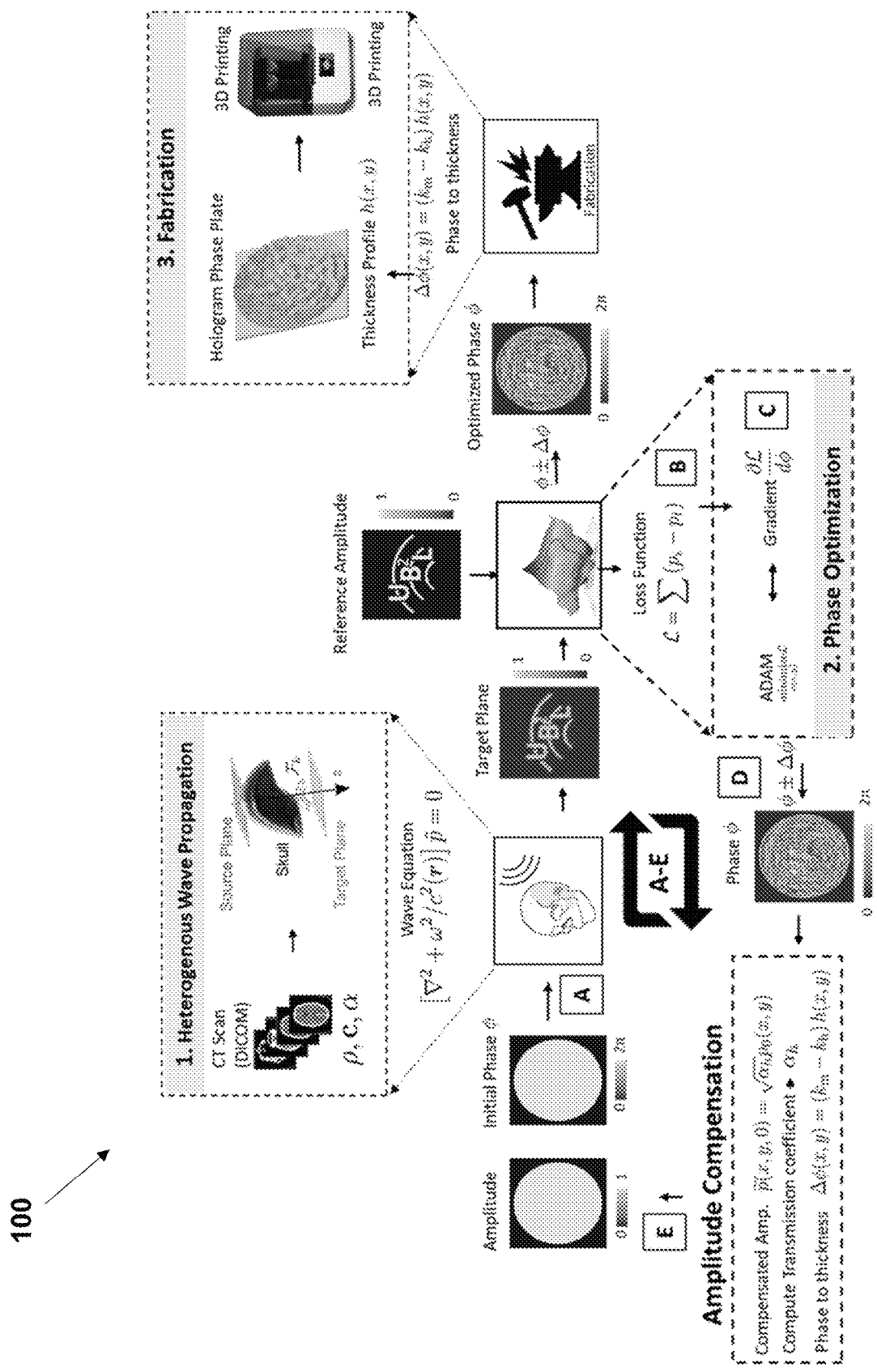
FIG. 1 is a schematic process flow of an example method for designing and producing a hologram for an ultrasound device, in accordance with some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of systems and methods for imaging and focusing using ultrasound and, more particularly, to producing and registration of an acoustic holographic lens for trans-skull ultrasound. In some examples, the systems and methods may be described in the context of treating patients, including human and other animal patients. The present disclosure, however, is not so limited and can be applicable in outer contexts. For example, some examples of the present disclosure may improve upon imaging and targeting in inanimate systems. The present systems and methods can be used in mining, piping, drilling, and similar processes that include using ultrasounds to visualize and target point sources. Additionally, reference is made herein to ultrasounds techniques for targeting through bone, including a human skull. It will be understood that such disclosure is illustrative, as the imaging and focusing techniques can be applied equally to other surfaces, such as in abdominal areas. Accordingly, when the present disclosure is described in the context of imaging and focusing of ultrasounds in any particular biological setting, it will be understood that other embodiments can take the place of those referred to.

As described above, current systems and methods that use ultrasounds for imaging and targeting have inherent limitations in the feedback and resolution of the ultrasound waves. In some examples, the limitations can be in the form of focal problems associated with the heterogenous surfaces through which the ultrasound waves pass. Considering for example a skull, different areas of the skull have varying thicknesses, or aberrations, and, thus, varying speed of sound waves propagating through the surface. Inherently related to the problem of errors in transcranial FUS targeting due to skull aberrations is that of source localization. The present disclosure addresses this challenge and the challenges described above by introducing a novel frequency-domain approach for hologram design and a lens registration strategy that leverages the nonlinear parametric array effect. This alternative approach for FUS-based treatment of neurological disorders can use 3D-printed phase-only acoustic holograms (i.e., lenses) in combination with a single transducer element. This approach is more cost-effective and does not rely on MRI. A heterogenous angular spectrum approach (HASA) is employed as a forward propagator to optimize the phase of the holographic lens for the target plane(s) inside the brain. In other words, the HASA is utilized as a propagator to transmit signals between the source and target focal planes inside the brain. To iteratively optimize the phase and amplitude required at the target location, automatic differentiation can be employed. The resulting phase profile can then be converted into thickness for 3D printing using, for example, a complex transmission coefficient.

Furthermore, also described herein is the capability of registering the holographic lens to the skull geometry by leveraging the nonlinear parametric array effect. Simulations were conducted to demonstrate the potential of using a focused parametric array to detect misregistration of the lens with the skull. By exciting the transducer with two primary waves centered at, for example, 1 MHz and differing by, for example, 100 kHz, this approach allowed focusing of the difference frequency (100 kHz). The fundamental frequency can be in the range of, for example, 100 kHz-20 MHz, and the difference frequency can be in the range of, for example, 1 kHz-500 kHz, although both frequencies can be beyond these ranges. The amplitude of the difference frequency is directly proportional to the amplitude of the primary frequency, which in turn depends on the accuracy of the lens registration with the skull geometry.

This method can be extended to transcranial focusing using phased array-based ultrasound systems. The use of phased arrays allows controlling both the phase and amplitude of the source allowing more flexibility as compared to phase-only control using holographic lenses. Furthermore, this technology can be further extended to transcranial imaging applications such as passive acoustic mapping for monitoring and guidance of microbubble-enhanced focused ultrasound (FUS) brain therapies.

I. Methods

A. Hologram Design

To design 3D-printed phase-plated acoustic holograms, a framework was developed that uses a HASA for wave propagation. More specifically, a heterogenous wave propagation approach is employed to iteratively optimize the phase of the holographic lens. This method iteratively optimizes the hologram's phase through three key steps: 1) modeling wave propagation in the frequency domain, 2) employing an iterative optimizer to reduce a loss function, and 3) devising a fabrication strategy that converts optimized phases into physical thickness for 3D printing realization. The approach employed by the present disclosure uses the addition of skull heterogeneity in the wave propagation and an automatic differentiation framework Diff-PAT for hologram optimization.

Designing the hologram in the frequency domain approach by solving the inhomogeneous Helmholtz equation allows orders of magnitude reduction in computational cost thus making it amenable to clinical scale geometry and volumetric targeting.

1) Heterogeneous Wave Propagation with ASA:

Starting with a uniform phase, step 1 (FIG. 1) in this process is heterogenous wave propagation. Acoustic properties are estimated from micro-CT scan intensities using a semi-empirical Hounsfield unit conversion. Then the field is computed at the target plane(s) through a human skull segment and the losses are determined in phase and amplitude concerning the desired target field, using the HASA. This process is frequency selective and computationally efficient. Thus, it is well suited to the real-time, narrowband problem of interest.

With more specificity, the first step in the design process is to model wave propagation through the skull heterogeneity. For a time harmonic pressure field $p\tilde{\ }(r)e^{-i\omega t}$, where $\omega$ is the angular frequency, the angular spectrum P is given by its 2D spatial Fourier transform:

$$P(k_x, k_y, z) = \mathcal{F}_k[p(x, y, z)] \quad (1)$$
$$\equiv \int\int_{-\infty}^{\infty} \tilde{p}(x, y, z)e^{-i(k_x x + k_y y)}dxdy.$$

For heterogeneous media where the spatial variation of sound speed c(r) is less compared to the wavelength, then the ordinary differential equation for the angular spectrum P becomes:

$$\frac{d^2 P}{dz^2} + k_z^2 P = \Lambda * P. \quad (2)$$

Here,

-continued $$\Lambda = \mathcal{F}_k[k_0^2(1-\mu)], k_0 = \omega/c_0, \mu = c_0^2/c^2,$$

where $c_0$ is a reference (average) sound speed, and * indicates two-dimensional convolution over the component wavenumbers $k_x$ and $k_y$. For this design, the skull and tissue densities were obtained from micro-CT scan data of a human skull (with original resolution 95 µm binned to 150 µm which amounts to 10 points per wavelength for $f_0=1$ MHz and considering equilibrium sound speed $c_0=1480$ m/s in water). The absorption due to the skull was not considered in this wave propagation model.

An implicit solution of Eq. (2) may be obtained with a Green's function technique, and numerical approximation allows computation of P at arbitrary z via:

$$P^{n+1} \approx P^n e^{ik_z\Delta z} + \frac{e^{ik_z\Delta z}}{2ik_z}(P^n * \Lambda) \times \Delta z, \quad (3)$$

where $P^n = P(k_x, k_y, n\Delta z)$.

Provided the marching step size $\Delta z$ is much smaller than the wavelength ($\lambda$), Eq. (3) enables calculation of the field in the heterogeneous medium. $\Delta z=150$ µm was chosen which is $\lambda/10$.

2) Phase Optimization:

The subsequent step in the design process involves the iterative refinement of the phase profile to enhance its accuracy and effectiveness. The amplitude at the focal plane is compared with the target plane and gradients are taken with respect to the source phase distribution. In this step, an ADAM optimizer is used for efficient stochastic optimization with only first-order gradients. As an alternative, Diff-PAT may be used, which is an automated differentiation toolbox. Use of automatic differentiation facilitates faster convergence as compared to conventional iterative projection methods for hologram design.

With more specificity, this process begins by establishing an initial condition where the phase distribution at the transducer plane is assumed to be zero phase and uniform amplitude. A circular mask spanning the diameter of the transducer (60 mm) was chosen to apply the required initial phase and amplitude mask. Utilizing the HASA, as detailed in the Methods section herein, we model the complex amplitude propagation to the target plane. The effectiveness of this propagation is quantitatively assessed by comparing the computed amplitude at the target plane with a predefined reference amplitude. This comparison is facilitated through a loss function based on mean absolute errors, mathematically represented as:

$$\mathcal{L} = \sum_x^N \sum_y^N (|P(x,y)_i - P(x,y)_t|) \quad (4)$$

In this equation, $P(x, y)_i$ represents the calculated pressure amplitude in the frequency domain at a given pixel location (x, y), whereas $P(x, y)_t$ denotes the corresponding target pressure amplitude. The computed pressure amplitude $P(x, y)_i$ is the pixel-wise value of P as derived from the HASA marching algorithm Eq. (3).

To optimize this loss function, we calculate its first-order gradients using an automatic differentiation framework, leveraging the ADAM optimizer within TensorFlow. This iterative optimization process continues until the phase profile converges to within a specified error tolerance in the phase increment or until a predetermined maximum number of iterations is achieved.

Furthermore, to account for the impact of hologram thickness on the amplitude transmission the optimization routine considers for the impact of hologram thickness on the amplitude transmission. This is achieved by converting the refined phase profile at the transducer surface into a thickness map. This conversion relies on the relationship between phase change and thickness variation, represented by:

$$\Delta\phi(x,y) = (k_w - k_h)\Delta h(x,y) \quad (5)$$

Here, $k_w$ and $k_h$ denote the wave numbers for water and the hologram material, respectively. The thickness in turn used to compute the transmission coefficient $\alpha_T$ and the complex amplitude at the hologram plane follow the expressions given in Eq. (3).

FIG. 1 is a schematic process flow 100 of an example method for designing and producing a hologram for an ultrasound device, in accordance with some embodiments of the present disclosure. The example steps of the hologram design can be summarized as shown in FIG. 1 and which can be delineated as follows:

A) Propagate the pressure field from source to image or target plane to obtain $P(x, y)_i$ B) Compute loss function as a mean absolute error between obtained pressure field $P(x, y)_i$ and reference target field $P(x, y)_t$ C) Compute the gradient of the loss function with respect to the input phase $$\frac{\partial \mathcal{L}}{d\phi}$$

D) Apply amplitude compensation considering transmission due to the finite thickness of the hologram $\alpha_h$ E) Update the phase $\phi \pm \Delta\phi$ following a gradient descent approach F) Repeat from Step A) until the desired number of iterations is reached.

3) Hologram Fabrication

Figure 3:
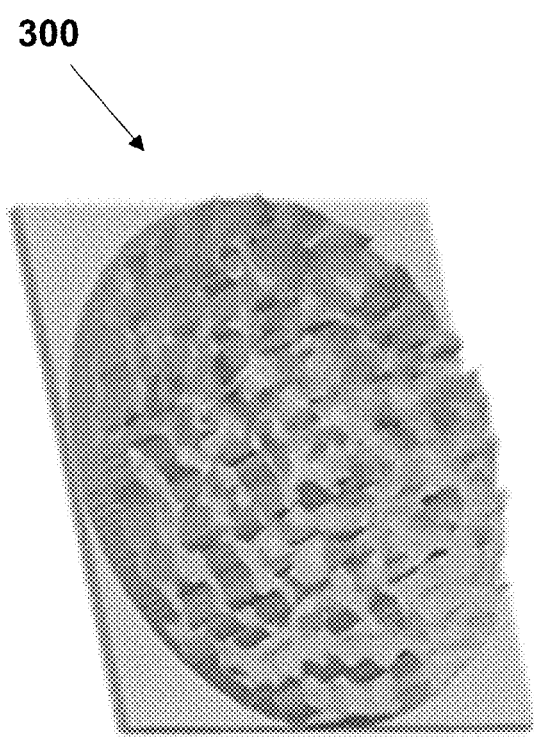
FIG. 3 is a diagram of a 3D printed hologram, in accordance with some embodiments of the present disclosure.

The last step in the design process is the fabrication of the hologram. FIG. 3 is a diagram of a 3D printed hologram 300, in accordance with some embodiments of the present disclosure. In fabricating/printing the hologram 300, Eq. (5) is utilized to convert the optimized phase profile map to a thickness profile map (e.g., by scaling with the relative wave number of the lens material relative to the background medium), which is used to 3D print the hologram. In the design, we have used clear white v4 resin from Formlabs (Somerville, MA). This resin has low attenuation values across the frequency range of interest and higher greater speed of sound (with group velocity $c_g=2591$ m/s and attenuation, $\alpha_0=2.922$ dB MHz$^{-1.044}$ cm$^{-f}$) making it suitable for 3D printing of acoustic holograms.

The results indicate about a 9 dB increase in the peak signal-to-noise ratio (PSNR) of the hologram at 1 MHz as compared to the case where skull-related aberrations were not accounted for. The design is confirmed using the experimentally validated k-wave simulations and showed that the lens and aperture design can be combined to target deep brain structures (>6 cm deep). The frequency domain method is computationally efficient and allows for iterative focal improvement between source and target without the need for virtual sources (usually implemented in time reversal-based approaches) and using materials that are compatible with 3D printers.

Figure 4:
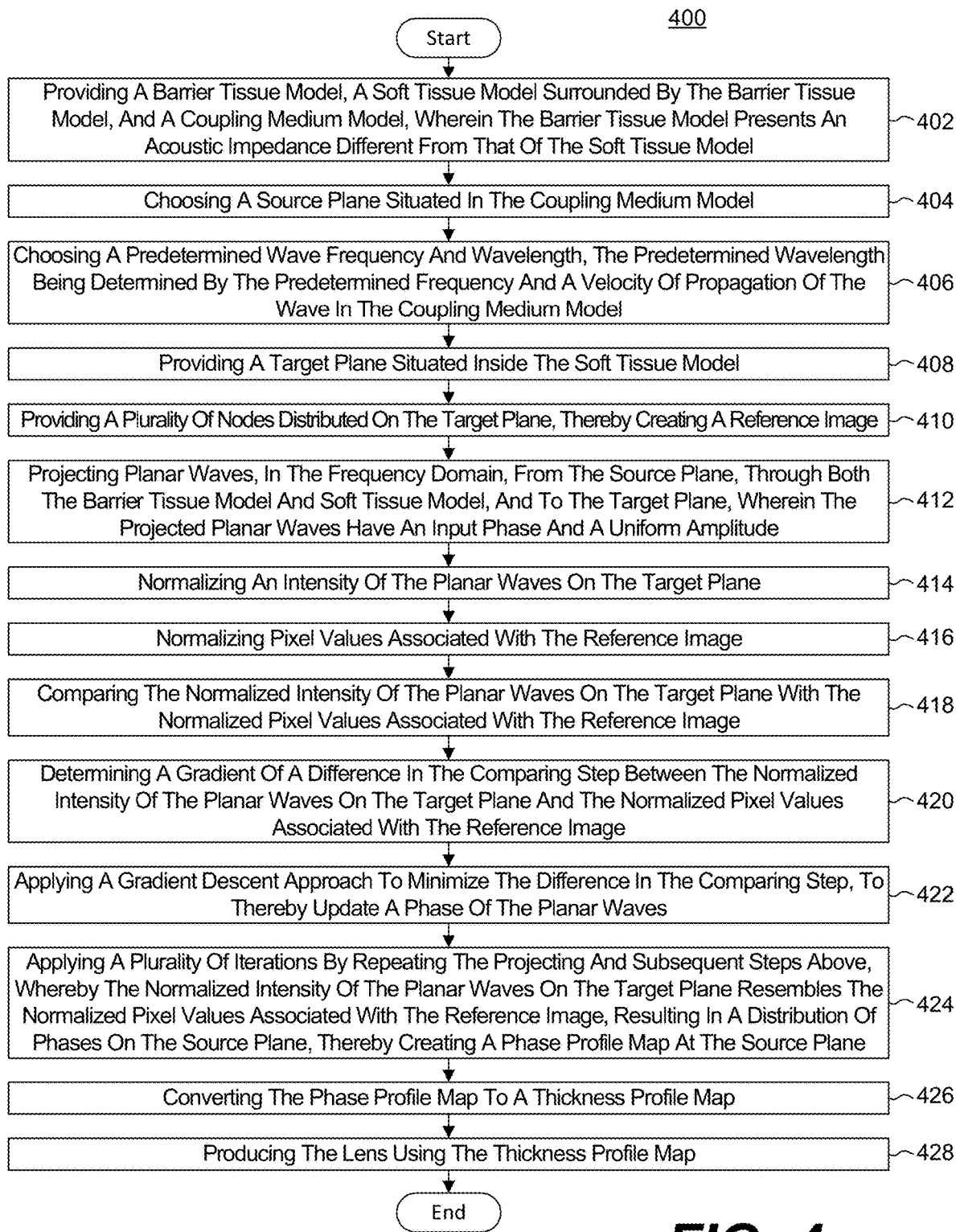
FIG. 4 is a flowchart of an example method for producing a lens for an ultrasound device, in accordance with some embodiments of the present disclosure.

FIG. 4 provides a flowchart of one embodiment of an example method 400 for producing a lens for an ultrasound device. The method 400 begins and comprises: providing a barrier tissue model, a soft tissue model surrounded by the barrier tissue model, and a coupling medium model, wherein the barrier tissue model presents an acoustic impedance different from that of The soft tissue Model (block 402); choosing a source plane situated in the coupling medium model (block 404); choosing a predetermined wave frequency and wavelength, the predetermined wavelength being determined by the predetermined frequency and a velocity of propagation of the wave in the coupling medium model (block 406); providing a target plane situated inside the soft tissue model (block 408); providing a plurality of nodes distributed on the target plane, thereby creating a reference image (block 410); projecting planar waves, in the frequency domain, from The Source Plane, through both the barrier tissue model and soft tissue model, and to the target plane, wherein the projected planar waves have an input phase and a uniform amplitude (block 412); normalizing an intensity of the planar waves on the target plane (block 414); normalizing pixel values associated with the reference image (block 416), comparing the normalized intensity of the planar waves on the target plane with the normalized pixel values associated with the reference image (block 418), determining a gradient of a difference in the comparing step between the normalized intensity of the planar waves on the target plane and the normalized pixel values associated with the reference image (block 420), applying a gradient descent approach to minimize the difference in the comparing step, to thereby update a phase of the planar waves (block 422), applying a plurality of iterations by repeating the projecting and subsequent steps above, whereby the normalized intensity of the planar waves on the target plane resembles the normalized pixel values associated with the reference image, resulting in a distribution of phases on The Source Plane, thereby creating a phase profile map at The Source Plane (block 424), converting the phase profile map to a thickness profile map (block 426), producing the lens using the thickness profile map (block 428), and the method 400 ends.

B. Hologram Registration

Registering the hologram with the skull geometry is crucial to the clinical translation of this technology. Since a lens is designed to correct for aberration considering a specific orientation of the skull geometry, ensuring the lens and the skull are aligned in practice as intended in the design is paramount for successful therapeutic application.

We use the nonlinear parametric array effect to detect misregistration of the lens with respect to the skull bone and correct it. By exciting the transducer with two primary waves centered around a high fundamental frequency (e.g. 1 MHz) and differing by a suitable low frequency known as the difference frequency (e.g. 100 kHz), we can focus the difference frequency in the brain in the weakly nonlinear regime. The amplitude of the difference frequency is directly proportional to the amplitude of the primary frequency, and the non-linearity of the medium given by the following relation:

$$|p_{\Delta f}| \propto \beta |p_0|^2 \qquad (6)$$

where $|p_0|$ and $|p_{\Delta f}|$ are the magnitude of the primary and difference frequency waves respectively, and $\beta$ is the parameter of nonlinearity. $\beta$ values of for high density trabecular bone ($\beta_{bone}$=374±15%) is significantly higher than coupling media such as water ($\beta_{water}$=5.2) and brain ($\beta_{brain}$=6.9).

Figure 2A:
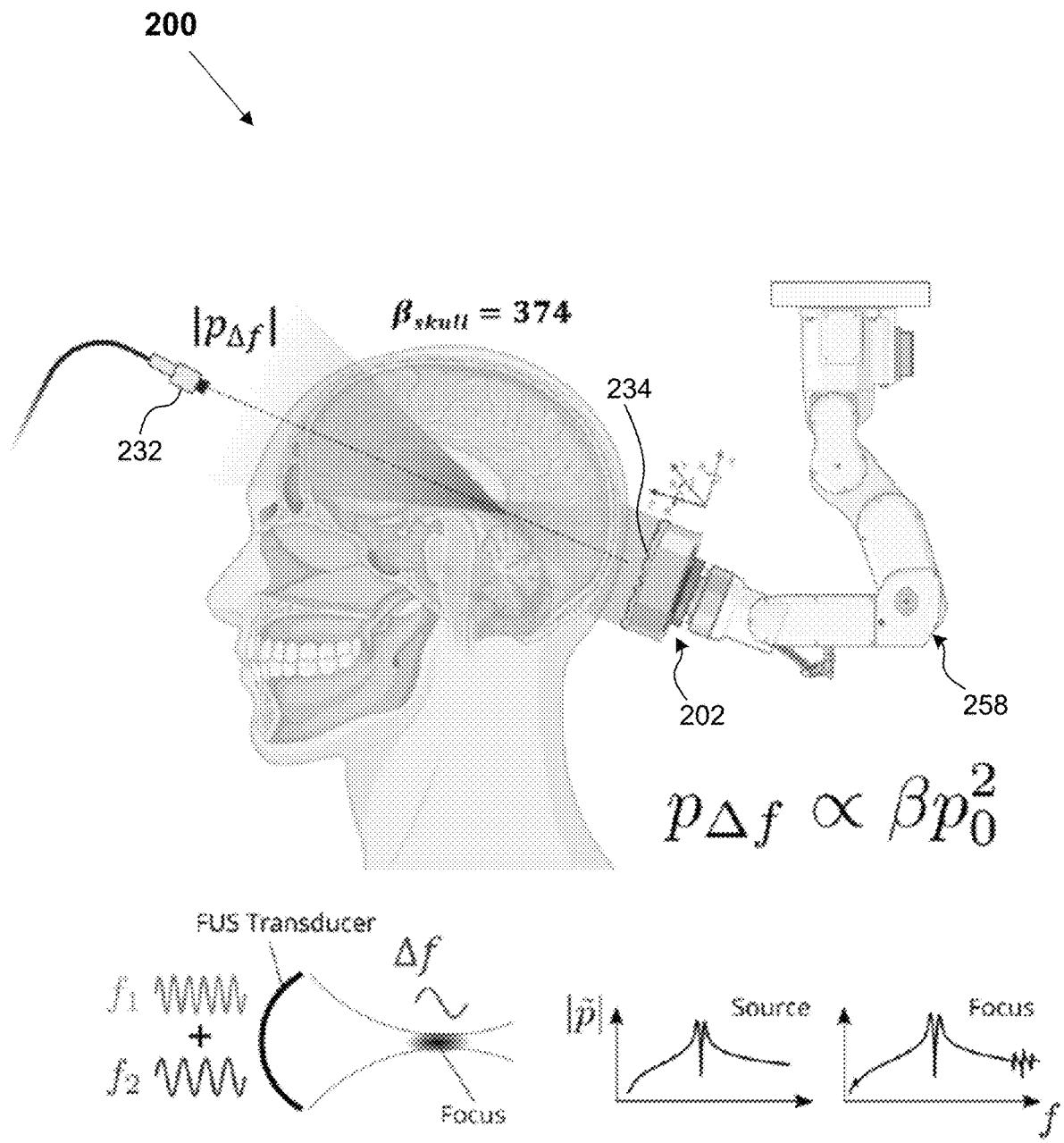
FIG. 2A is a schematic diagram illustrating an example hologram registration process, in accordance with some embodiments of the present disclosure.
Figure 2B:
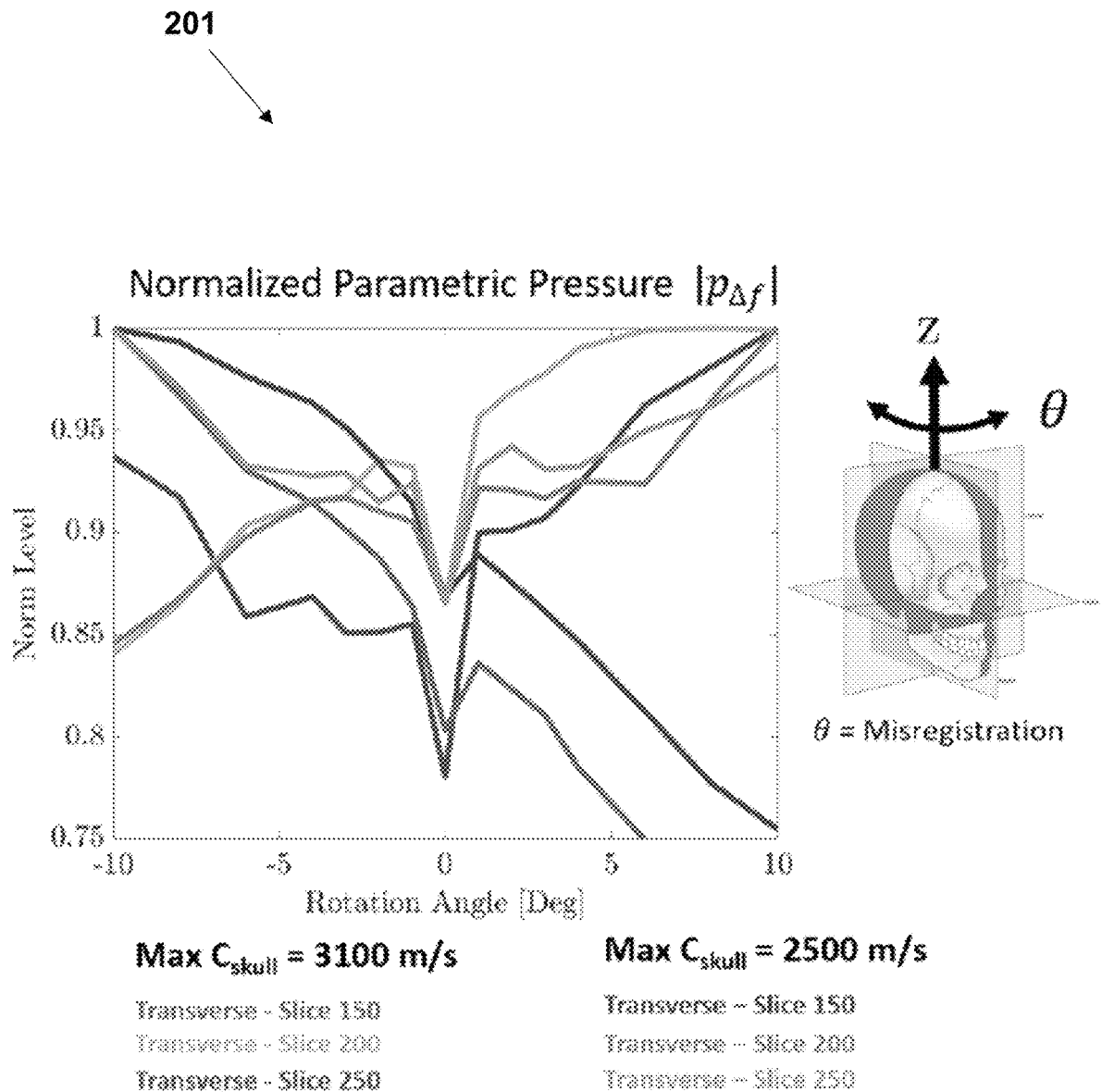
FIG. 2B is a plot illustrating simulation results employed in an example hologram registration process, in accordance with some embodiments of the present disclosure.

It is hypothesized that a drop in parametric pressure is a good indication of accurate registration. A misregistered skull leads to a rise in the primary frequency pressure $|p_0|$ within the skull bone. Due to the high non-linearity of the skull bone $\beta_{bone}$, the difference frequency pressure $|p_{\Delta f}|$ increases in the subsequent propagating medium. Conversely, a well-registered skull has lesser chances of local maxima of primary pressure within the skull bone. This leads to a sharp drop in the difference frequency pressure $|p_{\Delta f}|$. The drop in difference frequency pressure thus serves as an excellent indicator of registration of the lens with the skull bone. FIG. 2A is a schematic diagram 200 illustrating an example hologram registration process, in accordance with some embodiments of the present disclosure. The diagram 200 illustrates the hologram registration process using nonlinear parametric array effect where nonlinear mixing of two high-frequency waves at higher intensity gives rise to the low difference frequency. The diagram 200 depicts an example patient-specific registration of the lens 234 using a multi-degrees of freedom robotic arm 258 as a manipulator guided by a drop in $|p_{\Delta f}|$ as obtained from a sensor 232 placed outside the patient brain opposite to the transducer 202. FIG. 2B is a plot 201 illustrating simulation results employed in an example hologram registration process, in accordance with some embodiments of the present disclosure. The plot 201 shows the simulation results confirming the hypothesis that the drop in parametric pressure $|p_{\Delta f}|$ is indicative of good registration (i.e. the rotation error in the transverse plane θ=0).

Figure 5:
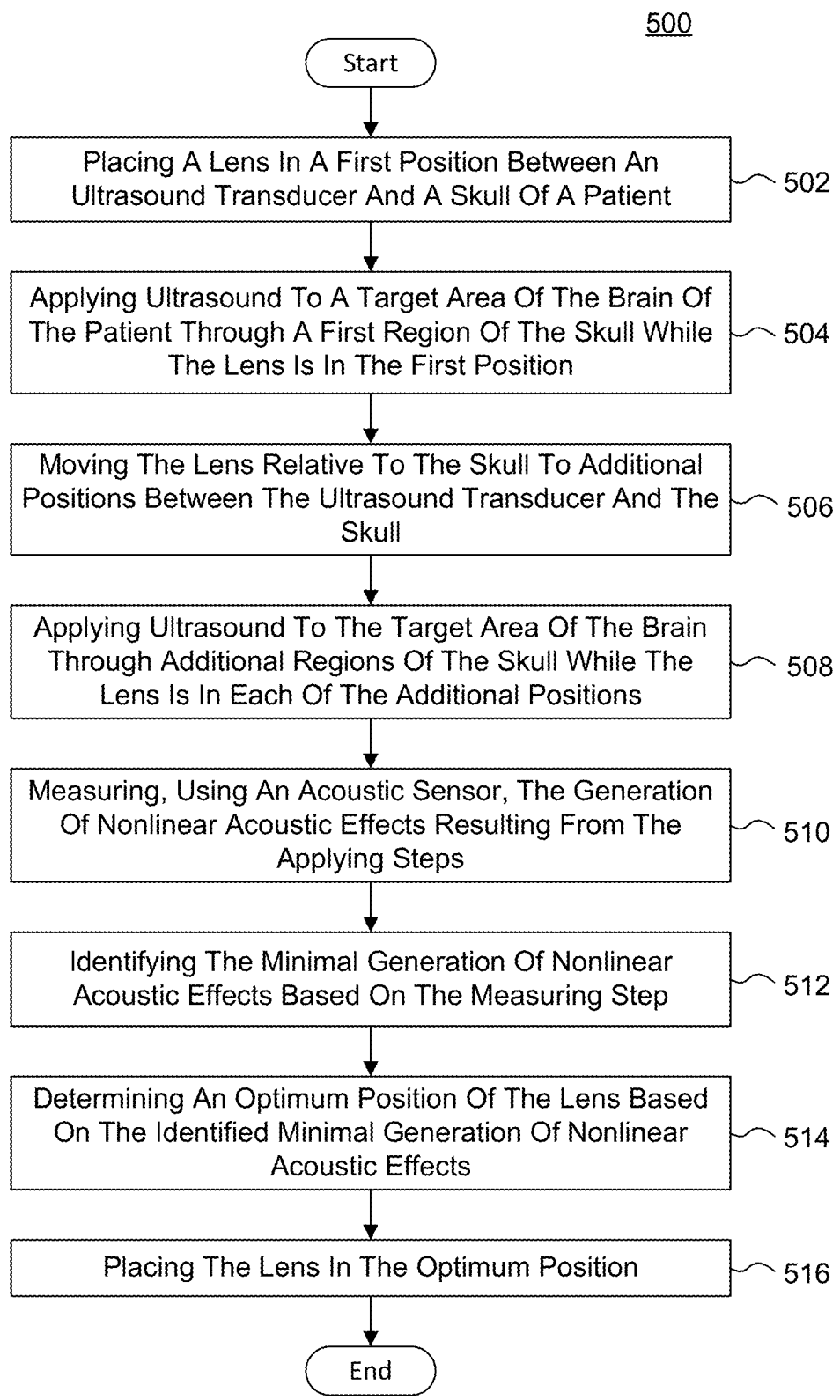
FIG. 5 is a flowchart of an example method for positioning a lens for an ultrasound device, in accordance with some embodiments of the present disclosure.

FIG. 5 provides a flowchart of one embodiment of an example method 500 for positioning a lens for an ultrasound device. The method 500 begins and comprises: placing a lens in a first position between an ultrasound transducer and a skull of a patient (block 502); applying ultrasound to a target area of the brain of the patient through a first region of the skull while the lens is in the first position (block 504); moving the lens relative to the skull to additional positions between the ultrasound transducer and the skull (block 506); applying ultrasound to the target area of the brain through additional regions of the skull while the lens is in each of the additional positions (block 508); measuring, using an acoustic sensor, the generation of nonlinear acoustic effects resulting from the applying steps (block 510); identifying the minimal generation of nonlinear acoustic effects based on the measuring step (block 512); determining an optimum position of the lens based on the identified minimal generation of nonlinear acoustic effects (block 514); placing the lens in the optimum position (block 516), and the method 500 ends.

II. Technical Innovations and Applications

The approach described herein for design and registration of acoustic hologram solves two major challenges in hologram-assisted brain therapy. First, the HASA is computationally efficient and scalable to larger computational domains than time-domain-based approaches due to its frequency selectivity. By utilizing automatic differentiation, HASA can serve as a differentiable wave propagator to iteratively optimize the source phase profile for arbitrary spatial targeting.

Second, the parametric array effect enables the focusing of low-frequency (kHz) waves, providing a metric for the registration of the lens with the skull geometry. The nonlinear parametric array focusing of kHz range difference frequency can penetrate the skull non-invasively and be measured in a clinical setting, making it a valuable tool for clinical applications. Furthermore, the following can be conceived as the potential applications of this technology:

1) The proposed method can be used for focusing and imaging with ultrasound frequencies in both strongly heterogeneous (e.g., human skull) as well as weakly heterogeneous (e.g., abdominal fat).
2) The hologram-assisted brain therapy system described herein can be used to elicit a nonlinear response of microbubbles toward imaging and therapeutic applications.
3) Using the system subwavelength focusing kHz range pressure due to nonlinear parametric array effect can also be used to affect the mechanical response of biological tissue towards applications such as neuromodulation and Vibro-acoustography.
4) The nonlinearity of skull bone can also be exploited by using the low-frequency parametric response to elicit a nonlinear response in the coupled skull-brain interface.
5) The methods developed here for trans-skull focusing using a 3D printed lens can also be extended to phased array-based systems for both imaging and focusing applications.
6) In addition to parametric array effect-based registration correction, registration of the skull bone to the FUS therapy system can be achieved through iterative optimization of the backscattered linear first-order signal in a wave inversion-based scheme using a multi-element receiver.

III. Systems to Employ the Present Methods

Figure 6A:
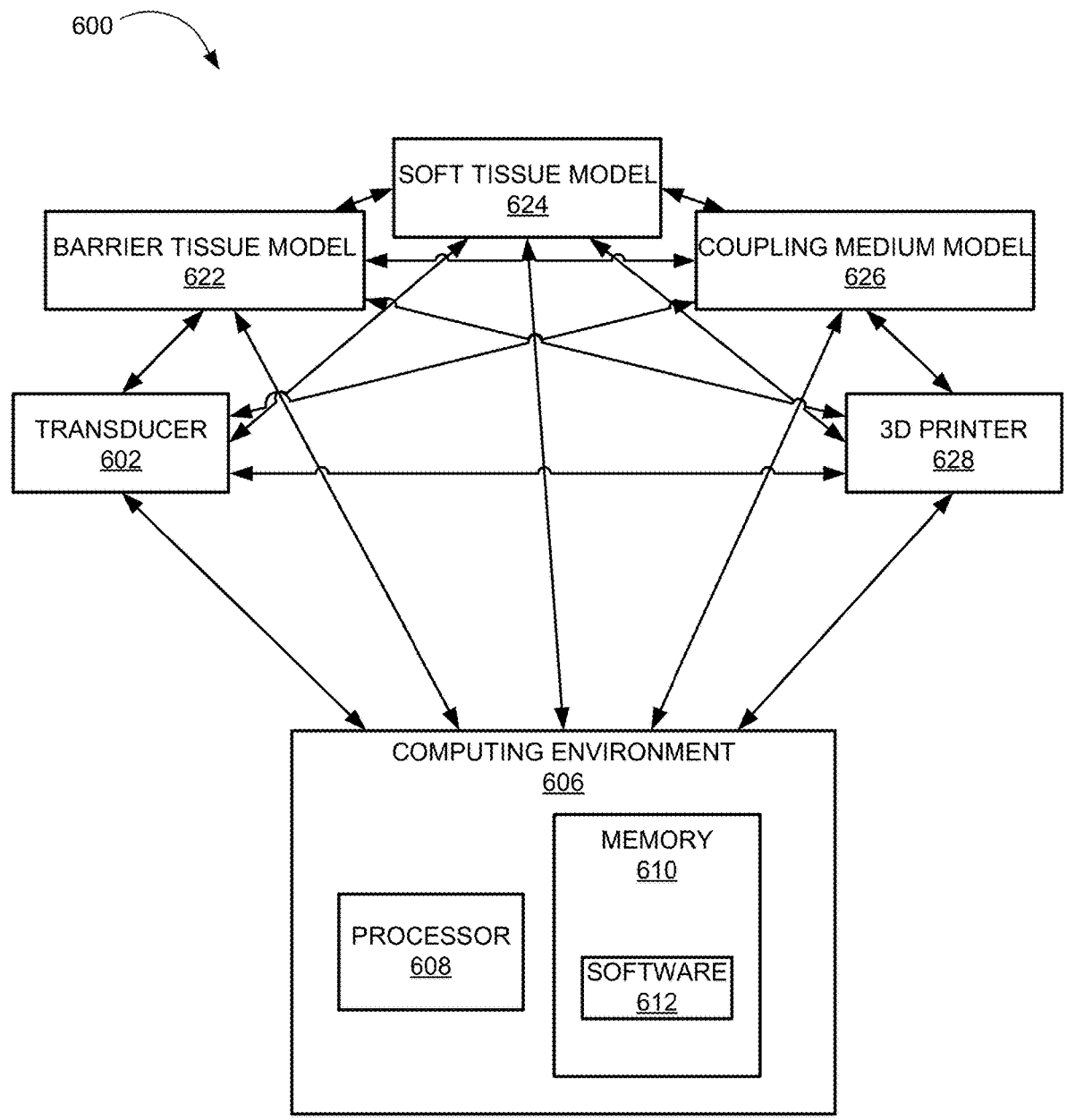
FIG. 6A is an example system for producing a hologram for an ultrasound device, including components that can employ the methods described herein, in accordance with some embodiments of the present disclosure.

The systems and methods described herein can be performed with ultrasound systems that include a transducer and additional components such as described below. FIG. 6A is an example system 600 including components that can employ the methods described herein, according to some embodiments of the present disclosure. The system 600 can include an ultrasound transducer 602, barrier tissue model 622, soft tissue model 624, coupling medium model 626, and 3D printer 628. The transducer 602 can be a device that produces ultrasound waves across or beneath a surface and to a region of interest.

Figure 6B:
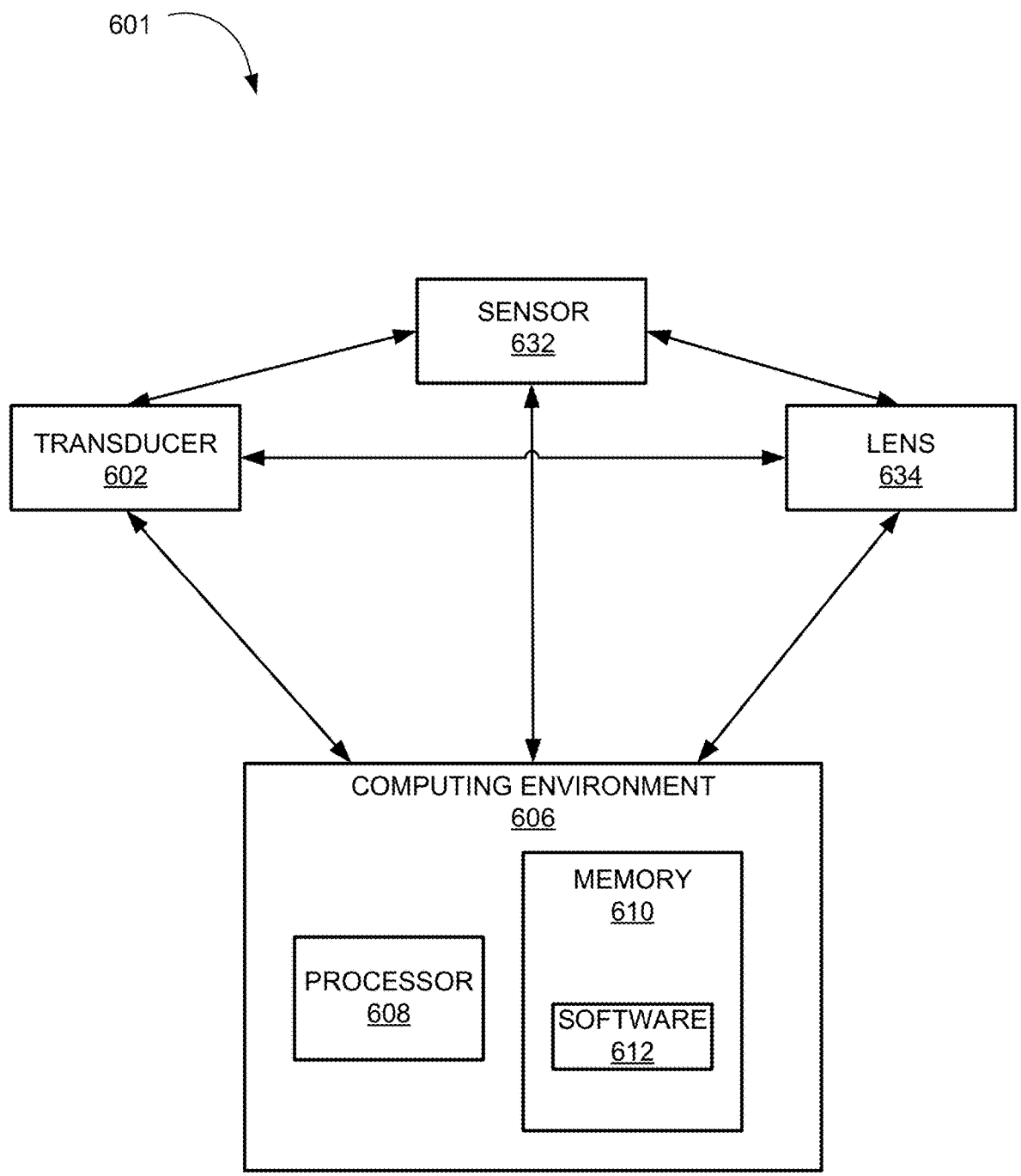
FIG. 6B is another example system for positioning a hologram for an ultrasound device, including components that can employ the methods described herein, in accordance with some embodiments of the present disclosure.

FIG. 6B is an example system 601 including components that can employ the methods described herein, according to some embodiments of the present disclosure. The system 601 can include a transducer 602, sensor 632, and lens 634. As in system 600, the transducer 602 in system 601 can be a device that produces ultrasound waves across or beneath a surface and to a region of interest. The sensor 634, can receive the radio frequency (RF) signals of the ultrasound waves transmitted though the region of interest in the brain and though the skull.

Systems 600 and 601 for performing the steps described herein can each be embodied in a computing environment 606. For each of systems 600 and 601, the computing environment 606 can be a computer or ultrasound workstation including computing comments. The computing environment 606 can include one or more processors 608. The one or more processors 608 can perform some of the calculations and transformations described herein, including but not limited to calculating an angular spectrum. The processor 608 can include one or more of a microprocessor, microcontroller, digital signal processor, co-processor or the like or combinations thereof capable of executing stored instructions and operating upon stored data. The processor 608 can be in communication with the transducer 602 and/or the receiver 604.

For each of systems 600 and 601, the computing environment 606 can also include a memory 610. The memory can be in communication with the processor 608. The memory 610 can include instructions, for example software 612 or other application, that causes the processor 608 to perform any of the methods described herein, including those listed above in reference to the processor. The memory 610 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

In some examples using system 600, the transducer 602, memory 610, one or more processors 608, and the like can be incorporated into a single device such that the methods described herein can be performed in any setting, such as a clinical setting.

Similarly, in some examples using system 601, the transducer 602 and/or sensor 634, memory 610, one or more processors 608, and the like can be incorporated into a single device such that the methods described herein can be performed in any setting, such as a clinical setting.

TABLE 1

| Mathematical Notations | |
|---|---|
| * | 2D convolution f * g ≡ $\iint_{-\infty}^{\infty} f(k_x - k'_x, k_y - k'_y, z)\, g(k_x, k_y, z)\, dk'_x\, dk'_y$ |
| $\nabla$ | Gradient operator |
| $\nabla \cdot$ | Divergence operator |
| $\nabla^2$ | Laplacian operator |
| $\mathcal{F}$ | Temporal Fourier transform $\mathcal{F}[\bullet] \equiv \int_{-\infty}^{\infty} (\bullet)\, e^{i\omega t}\, dt$ |
| $\mathcal{F}_k$ | Spatial Fourier transform $\mathcal{F}_k[\bullet] \equiv \iint_{-\infty}^{\infty} (\bullet)\, e^{-i(k_x x + k_y y)}\, dx\, dy$ |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method comprising:
   placing an acoustic holographic lens in a first position between an ultrasound transducer and a skull of a patient;
   first applying ultrasound to a target area of a brain of a patient through a first region of the skull while the acoustic holographic lens is in the first position;
   moving the acoustic holographic lens relative to the skull to additional positions between the ultrasound transducer and the skull;
   second applying ultrasound to the target area of the brain through additional regions of the skull while the acoustic holographic lens is in each of the additional positions;
   measuring, using an acoustic sensor positioned to detect acoustic signals propagated through the skull, parametric pressure values at the first position and one or more of the additional positions, wherein the parametric pressure values are generated by nonlinear acoustic interactions between ultrasound waves and a skull-brain interface and quantify acoustic focusing efficiency through skull heterogeneity;
   identifying a position among the first position and one or more of the additional positions that yields a minimal measured parametric pressure value, wherein the minimum parametric pressure value indicates optimal ultrasound transmission through the skull with minimal aberration;
   determining an optimum position of the acoustic holographic lens based on the identified position that yields the minimal measured parametric pressure value; and
   placing the acoustic holographic lens in the optimum position.

2. The method of claim 1 further comprising:
   producing the acoustic holographic lens by:
      first providing a barrier tissue model, a soft tissue model surrounded by the barrier tissue model, and a coupling medium model, wherein the barrier tissue model presents an acoustic impedance different from that of the soft tissue model;
      first choosing a source plane situated in the coupling medium model;
      second choosing a predetermined wave frequency and wavelength of an ultrasound wave, the predetermined wavelength being determined by the predetermined wave frequency and a velocity of propagation of the ultrasound wave in the coupling medium model;
      second providing a target plane situated inside the soft tissue model;
      third providing a plurality of nodes distributed on the target plane, thereby creating a reference image;
      projecting planar ultrasound waves, in a frequency domain, from the source plane, through both the barrier tissue model and soft tissue model, and to the target plane, wherein the projected planar ultrasound waves have an input phase and a uniform amplitude;
      first normalizing an intensity of the planar ultrasound waves on the target plane;
      second normalizing pixel values associated with the reference image;
      comparing the first normalized intensity of the planar ultrasound waves on the target plane with the second normalized pixel values associated with the reference image;
      determining a gradient of a difference between the first normalized intensity of the planar ultrasound waves on the target plane and the second normalized pixel values associated with the reference image;
      first applying a gradient descent approach to minimize the difference between the first normalized intensity of the planar ultrasound waves on the target plane and the second normalized pixel values associated with the reference image, to thereby update a phase of the planar ultrasound waves;
      second applying a plurality of iterations by repeating the projecting, first normalizing, second normalizing, comparing, determining and first applying steps, whereby the first normalized intensity of the planar ultrasound waves on the target plane resembles the second normalized pixel values associated with the reference image, resulting in a distribution of phases on the source plane, thereby creating a phase profile map at the source plane;
      converting the phase profile map to a thickness profile map; and
      using the thickness profile map to produce the acoustic holographic lens.

3. The method of claim 2 further comprising:
   applying amplitude compensation considering transmission due to a finite thickness obtained from the phase profile map, whereby the uniform amplitude in the projecting step is adjusted based on the compensated amplitude.

4. The method of claim 2, wherein the comparing step is performed using a mean absolute loss function.

5. The method of claim 2, wherein the intensity of the planar ultrasound waves on the target plane is a square of the amplitude of the planar ultrasound waves on the target plane.

6. The method of claim 2, wherein the using step is performed using a 3D printer.

7. The method of claim 2, wherein the predetermined frequency is in a range of 100 kHz and 20 MHz.

8. The method of claim 2, wherein the gradient descent approach comprises a stochastic descent approach.

9. The method of claim 2, wherein the gradient descent approach uses an adaptive moment estimation (ADAM) optimizer.

10. The method of claim 2, wherein the source plane is at or within an ultrasound transducer.

11. The method of claim 1, wherein each of the first and second applying steps utilize two primary ultrasound waves centered around a fundamental frequency and differing by a difference frequency.

12. The method of claim 11, wherein the fundamental frequency is in a range of 100 kHz-20 MHz, and the difference frequency is in a range of 1 kHz-500 kHz.

13. The method of claim 1, wherein the acoustic sensor is placed exteriorly to the skull.

14. The method of claim 1, wherein the ultrasound transducer comprises;
a single ultrasound transducer; or
a phased array ultrasound transducer.

15. The method of claim 1, wherein the method provides real-time positioning optimization based on acoustic measurements.

16. An apparatus comprising:
an acoustic holographic lens produced by a method comprising:
first providing a barrier tissue model, a soft tissue model surrounded by the barrier tissue model, and a coupling medium model, wherein the barrier tissue model presents an acoustic impedance different from that of the soft tissue model;
first choosing a source plane situated in the coupling medium model;
second choosing a predetermined wave frequency and wavelength of an ultrasound wave, the predetermined wavelength being determined by the predetermined wave frequency and a velocity of propagation of the ultrasound wave in the coupling medium model;
second providing a target plane situated inside the soft tissue model;
third providing a plurality of nodes distributed on the target plane, thereby creating a reference image;
projecting planar ultrasound waves, in a frequency domain, from the source plane, through both the barrier tissue model and soft tissue model, and to the target plane, wherein the projected planar ultrasound waves have an input phase and a uniform amplitude;
first normalizing an intensity of the planar ultrasound waves on the target plane;
second normalizing pixel values associated with the reference image;
comparing the first normalized intensity of the planar ultrasound waves on the target plane with the second normalized pixel values associated with the reference image;
determining a gradient of a difference between the first normalized intensity of the planar ultrasound waves on the target plane and the second normalized pixel values associated with the reference image;
first applying a gradient descent approach to minimize the difference between the first normalized intensity of the planar ultrasound waves on the target plane and the second normalized pixel values associated with the reference image, to thereby update a phase of the planar ultrasound waves;
second applying a plurality of iterations by repeating the projecting, first normalizing, second normalizing, comparing, determining and applying steps, whereby the first normalized intensity of the planar ultrasound waves on the target plane resembles the second normalized pixel values associated with the reference image, resulting in a distribution of phases on the source plane, thereby creating a phase profile map at the source plane;
converting the phase profile map to a thickness profile map; and
using the thickness profile map to produce the acoustic holographic lens.

17. A system comprising:
an ultrasound transducer;
an acoustic holographic lens configured for positioning between the ultrasound transducer and a skull of a patient;
an acoustic sensor positioned to detect acoustic signals propagated through the skull and configured to measure parametric pressure values that quantify nonlinear acoustic interactions between ultrasound waves and a skull-brain interface;
a processor in communication with the ultrasound transducer and the acoustic holographic lens; and
a memory in communication with the processor and storing instructions that, when executed, cause the system to:
place the acoustic holographic lens in a first position between the ultrasound transducer and a skull of a patient;
first apply, via the ultrasound transducer, ultrasound to a target area of the brain of the patient through a first region of the skull while the acoustic holographic lens is in the first position;
move the acoustic holographic lens relative to the skull to additional positions between the ultrasound transducer and the skull;
second apply, via the ultrasound transducer, ultrasound to the target area of the brain through additional regions of the skull while the acoustic holographic lens is in each of the additional positions;
measure, using the acoustic sensor, parametric pressure values at each of the first and one or more of the additional positions, wherein the parametric pressure values are generated by nonlinear acoustic interactions and quantify acoustic focusing efficiency through skull heterogeneity;
identify a position among the first and one or more of the additional positions that yields a minimal measured parametric pressure value, wherein the minimum parametric pressure value indicates optimal ultrasound transmission;
determine an optimum position of the acoustic holographic lens based on the identified position that yields the minimal measured parametric pressure value; and
place the acoustic holographic lens in the optimum position.

18. The system of claim 17 further comprising:
a 3D printer;
a barrier tissue model;
a soft tissue model surrounded by the barrier tissue model, wherein the barrier tissue model presents an acoustic impedance different from that of soft tissue model; and
a coupling medium model;
wherein the processor is in further communication with the 3D printer; and
wherein the instructions, when executed, further cause the system to:
first choose a source plane, of the ultrasound transducer, situated in the coupling medium model;
second choose a predetermined wave frequency and wavelength of an ultrasound wave, of the ultrasound transducer, the predetermined wavelength being determined by the predetermined wave frequency and a velocity of propagation of the ultrasound wave in the coupling medium model;
first provide a target plane situated inside the soft tissue model;
second provide a plurality of nodes distributed on the target plane, thereby creating a reference image;

project, via the ultrasound transducer, planar ultrasound waves, in a frequency domain, from the source plane, through both the barrier tissue model and soft tissue model, and to the target plane, wherein the projected planar ultrasound waves have an input phase and a uniform amplitude;

first normalize an intensity of the planar ultrasound waves on the target plane;

second normalize pixel values associated with the reference image;

compare the first normalized intensity of the planar ultrasound waves on the target plane with the second normalized pixel values associated with the reference image;

determine a gradient of a difference between the first normalized intensity of the planar ultrasound waves on the target plane and the second normalized pixel values associated with the reference image;

first apply a gradient descent approach to minimize the difference between the first normalized intensity of the planar ultrasound waves on the target plane and the second normalized pixel values associated with the reference image, to thereby update a phase of the planar ultrasound waves;

second apply a plurality of iterations by repeating the projecting, first normalizing, second normalizing, comparing, determining and first applying steps above, whereby the first normalized intensity of the planar ultrasound waves on the target plane resembles the second normalized pixel values associated with the reference image, resulting in a distribution of phases on the source plane, thereby creating a phase profile map at the source plane;

convert the phase profile map to a thickness profile map; and produce, via the 3D printer, the acoustic holographic lens using the thickness profile map.

19. The system of claim 18 wherein the instructions further cause the system to:

third apply amplitude compensation considering transmission due to a finite thickness obtained from the phase profile map, whereby the uniform amplitude in the project step is adjusted based on the compensated amplitude.

20. The system of claim 17, wherein the compare step is performed using a mean absolute loss function.

21. The system of claim 18, wherein the intensity of the planar ultrasound waves on the target plane is a square of the amplitude of the planar ultrasound waves on the target plane.

22. The system of claim 18, wherein the predetermined frequency is in a range of 100 kHz and 20 MHz.

23. The system of claim 18, wherein the gradient descent approach comprises a stochastic descent approach.

24. The system of claim 18, wherein the gradient descent approach uses an adaptive moment estimation (ADAM) optimizer.

25. The system of claim 17, wherein each of the first apply and second apply steps utilize two primary ultrasound waves centered around a fundamental frequency and differing by a difference frequency.

26. The system of claim 25, wherein the fundamental frequency is in a range of 100 kHz-20 MHz, and the difference frequency is in a range of 1 kHz-500 kHz.

27. The system of claim 17, wherein the acoustic sensor is placed exteriorly to the skull.

28. The system of claim 17, wherein the ultrasound transducer comprises:

a single ultrasound transducer; or a phased array ultrasound transducer.

29. The system of claim 17, wherein the system provides real-time positioning optimization based on acoustic measurements.

* * * * *